United States Patent
Agombar et al.

(10) Patent No.: US 8,051,259 B2
(45) Date of Patent: Nov. 1, 2011

(54) SPACE EFFICIENT DE-ALLOCATION FOR CASCADE/MULTIPLE TARGET FLASH COPY CLEANING

(75) Inventors: John Paul Agombar, Hampshire (GB); Christopher Barry Edgar Beeken, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 12/144,329

(22) Filed: Jun. 23, 2008

(65) Prior Publication Data

US 2009/0319735 A1    Dec. 24, 2009

(51) Int. Cl.
*G06F 12/00* (2006.01)

(52) U.S. Cl. . 711/159; 711/162; 711/112; 711/E12.002; 711/E12.003

(58) Field of Classification Search .................. None
See application file for complete search history.

(56) References Cited

U.S. PATENT DOCUMENTS

| | | | |
|---|---|---|---|
| 6,799,258 B1 | 9/2004 | Linde | |
| 7,676,641 B2 * | 3/2010 | Agombar et al. | 711/162 |
| 2006/0064416 A1 | 3/2006 | Sim-Tang | |
| 2006/0143407 A1 * | 6/2006 | Humlicek | 711/143 |
| 2006/0143413 A1 * | 6/2006 | Agombar et al. | 711/162 |
| 2006/0206603 A1 | 9/2006 | Rajan et al. | |
| 2007/0239938 A1 * | 10/2007 | Pong | 711/122 |

* cited by examiner

*Primary Examiner* — Reginald Bragdon
*Assistant Examiner* — Aracelis Ruiz
(74) *Attorney, Agent, or Firm* — Yee & Associates, P.C.; Randall Bluestone (57) ABSTRACT

Illustrative embodiments provide a computer implemented method for incremental storage de-allocation during a clean process within a point-in-time copy storage management system. The computer implemented method determines whether to perform the clean process and responsive to a determination to perform the clean process, determines whether a set of discrepant bits is present. Responsive to the determination that the set of discrepant bits is present, the computer implemented method copies each dirty grain for each discrepant bit in the set of discrepant bits to a downstream target to form a set of copied dirty grains and determines whether a particular dirty grain in the set of copied dirty grains has been allocated to a space efficient storage unit. Responsive to a determination that the particular dirty grain was allocated to a space efficient storage unit, the computer implemented method de-allocates the particular grain from an upstream source.

6 Claims, 4 Drawing Sheets

SPACE EFFICIENT DE-ALLOCATION FOR CASCADE/MULTIPLE TARGET FLASH COPY CLEANING

BACKGROUND OF THE INVENTION

1. Field of the Invention

The present invention relates generally to an improved data processing system and more specifically to a computer implemented method, a data processing system and a computer program product for space efficient de-allocation for cascade/multiple target cleaning.

2. Description of the Related Art

In cascade implementations of multiple target Flash-Copy® devices, such as that available with the IBM® storage area network (SAN) volume controller, a write to the source disk for an area that has not yet been copied will result in the data being copied to just one of the target disks. For these implementations, a read I/O request submitted to a target disk may require FlashCopy to read data from the source disk, the target disk or another target disk in the cascade, depending on which source or target disks have previously been written to. For further details about cascaded Flash Copy implementations see the user publications for IBM SAN Volume Controller 4.2.0.

A disadvantage of the cascaded implementation over a traditional implementation is that it generates additional dependencies between the target disks. To be able to satisfy read requests from one target disk, a cascaded implementation may have to read data from another target disk in the cascade. Consequently, if a user wishes to stop and delete a Flash Copy mapping that is part of a cascade, it is first necessary to copy all the data that is required by other target disks in the cascade to another target disk. Within SAN volume control this process of copying data is called cleaning. While in this state, the target disk of the map being removed cannot be accessed to guarantee the cleaning operation completes. Only when the target is clean can a map be stopped and then deleted.

In a system where this implementation of multiple target FlashCopy is combined with space efficient disks or also known as, late allocation disks, the fact that this cleaning process must complete before the mapping can be deleted can create a problem. Consider the situation where there are many copies of a source disk and each of these copies is held on a space efficient target disk, for example, in a continuous data protection (CDP) system. As the number of copies increases, the system starts to run out of real storage to use for the space efficient disks. In order to free up storage, the system administrator may want to stop some of the less important copies and delete their target disks. Unfortunately, in order to stop these copies, the cleaning process has to complete. The copying of data may require even more real storage to be allocated. The system may reach a deadlock situation where the cleaning process requires more storage to be allocated, but there is not any storage to allocate until the cleaning process completes and the target disks are deleted.

BRIEF SUMMARY OF THE INVENTION

According to one embodiment of the present invention, illustrative embodiments provide a computer implemented method for incremental storage de-allocation during a clean process within a point-in-time copy storage management system. The computer implemented method determines whether to perform the clean process and responsive to a determination to perform the clean process, determines whether a set of discrepant bits is present. Responsive to the determination that the set of discrepant bits is present, the computer implemented method copies each dirty grain for each discrepant bit in the set of discrepant bits to a downstream target to form a set of copied dirty grains and determines whether a particular dirty grain in the set of copied dirty grains has been allocated to a space efficient storage unit. The computer implemented method, responsive to a determination that the particular dirty grain was allocated to a space efficient storage unit, de-allocates the particular grain from an upstream source.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
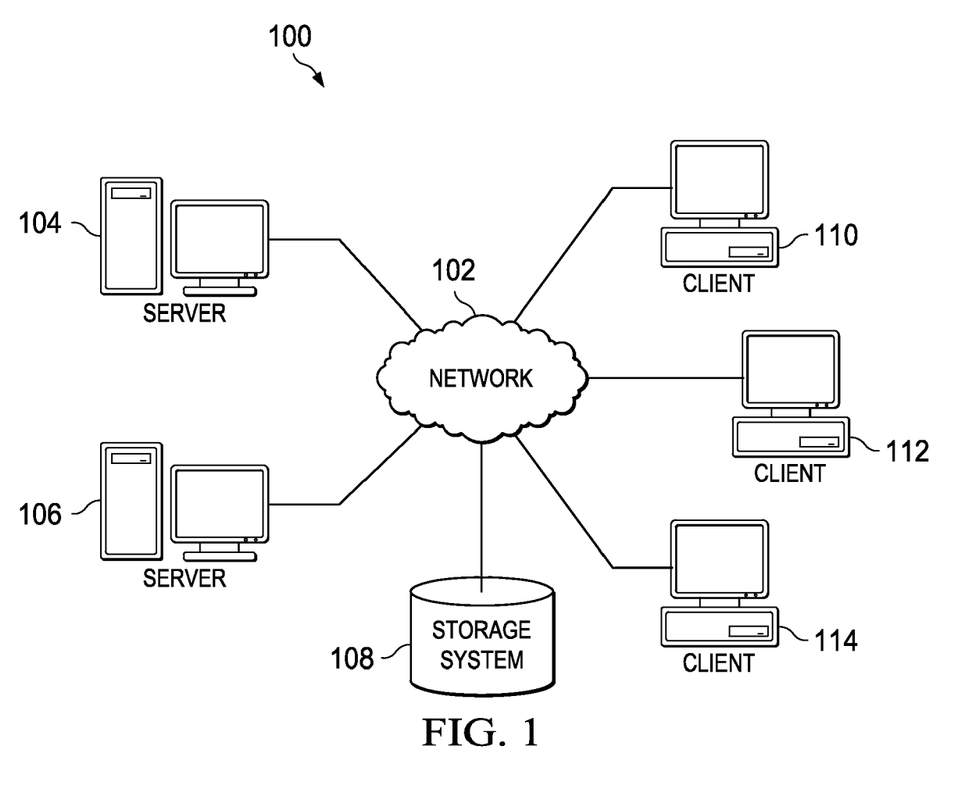
FIG. 1 depicts a pictorial representation of a network of data processing systems in which illustrative embodiments may be implemented.
Figure 2:
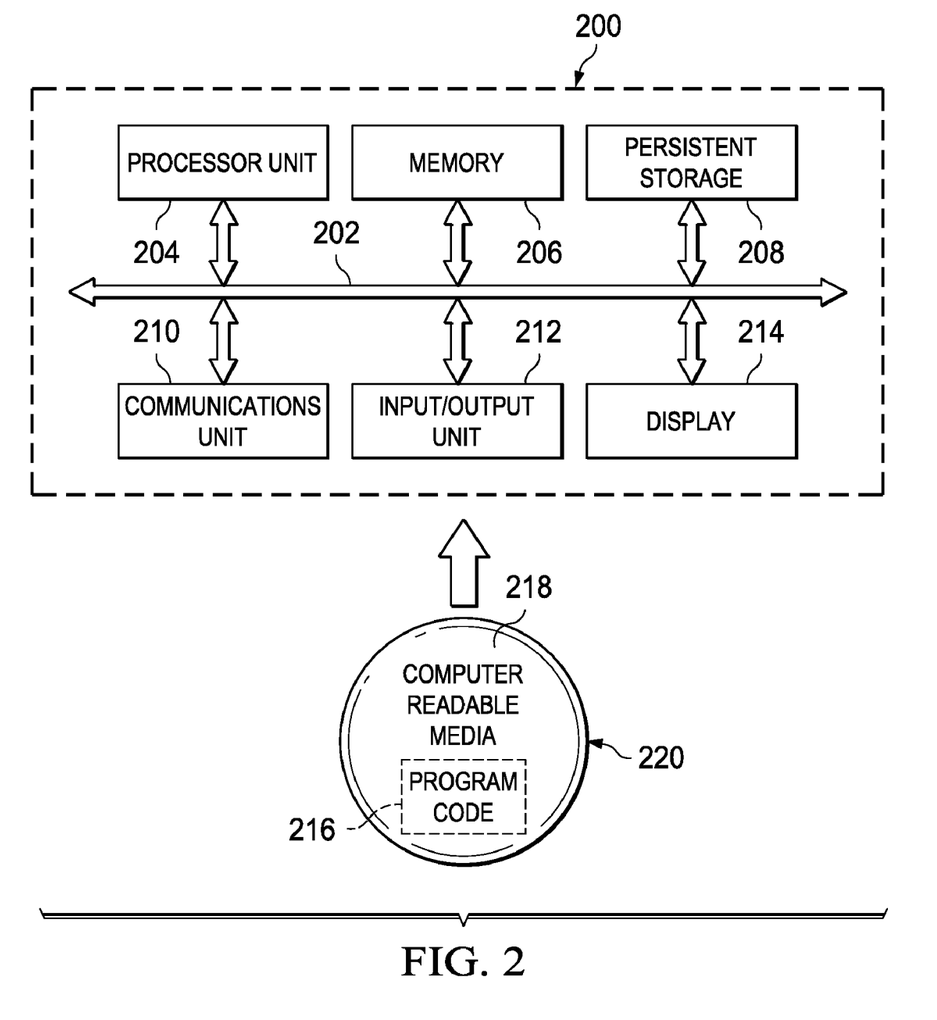
FIG. 2 is a block diagram of a data processing system is shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage system 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Illustrative embodiments provide a capability of an enhanced cleaning process used when stopping a FlashCopy mapping, as may be found in storage system 108. As each unit of data that is required by other disks in the cascade is copied to another target disk, the data on the target disk of the map that is being stopped can be de-allocated. In addition, data that is not required by other disks in the cascade can be de-allocated immediately, without the copy step. By performing the de-allocation as the cleaning process proceeds, the system is minimizing the chances of hitting a deadlock situation in which more storage is needed to perform the very operation needed to make more storage available. For example, using the system 100, if more storage is required on system 100, by users such as client 110 and server 106, storage system 108 comprising many disks may be used. If there is insufficient space to resolve the storage requests and some disks of storage system 108 are being used as backup disks in FlashCopy mappings that are no longer required, these mappings may be selected to be stopped which will cause a cleaning process to be started. In the process of cleaning, in accordance with illustrative embodiments, the storage is made available to requesters as storage is cleaned. The incremental clean and de-allocate cycle speeds the process of making storage available and reduces the chance of a deadlock occurring.

With reference now to FIG. 2, a block diagram of a data processing system is shown in which illustrative embodiments may be implemented. Data processing system 200 is an example of a computer, such as server 104, client 110, or storage system 108 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices and may also be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer recordable storage media. In some instances, computer recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
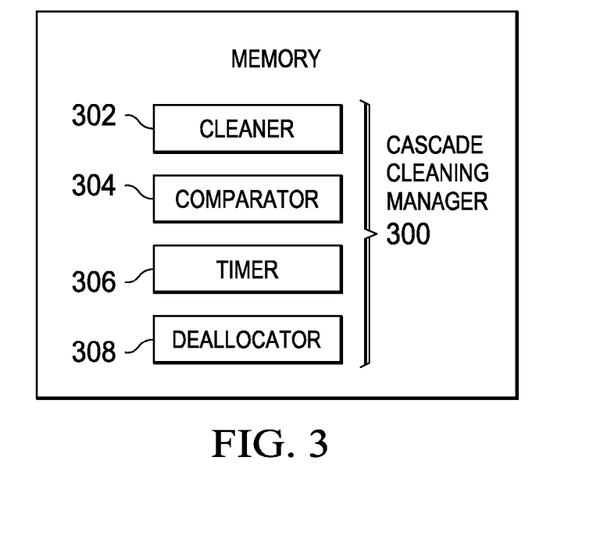
FIG. 3 is a block diagram of high level components of a cascade cleaning manager in accordance with illustrative embodiments.

With reference to FIG. 3, a block diagram of high level components of a cascade cleaning manager is shown in accordance with illustrative embodiments. Cascade cleaning manager 300 is depicted located within memory 206 of system 200 of FIG. 2, but may be located in other storage areas such as persistent storage 208 until required for use.

Cascade cleaning manager 300 includes a number of functional components including cleaner 302, comparator 304, timer 306 and deallocator 308 to accomplish tasks of incremental storage cleaning and de-allocation for FlashCopy targets. Cascade cleaning manager 300 provides the overall interface and packaging of the cleaning components.

Cleaner 302 provides a capability to recover previously used segments of storage in a storage subsystem. Comparator 304 provides a function to examine bit mappings to determine discrepancies. A discrepancy exists between bit maps when the value in a particular location of one map is not equal to the value in the corresponding location of the other map. In this case there are then discrepant bits.

Timer 306 provides a mechanism to stop or start an action, for example, a simple determination of when to initiate a cleaning process according to a schedule. Deallocator 308 provides a capability to free storage space after a cleaning operation has made the space available for reuse. The functions cooperate to provide the cascade cleaning management.

A grain is a sequence of contiguous logical block areas. On a space efficient disk, the grain may or may not be allocated. The grain therefore may or may not have some physical storage assigned to it. A disk consists of three descriptive elements comprising grains, upstream, and downstream. "Grains" is a sequence of grains which either hold the data for the disk or have a reference to indicate that no data has been written. Upstream is the upstream map, and downstream is the downstream map. A map consists of four descriptive elements of origSource, source, target, and split. Element origSource is the source disk specified by the user when the map was created. Source is the next upstream disk in the cascade, and target is the target disk specified by the user when the map was created. Split is a bitmap, with a bit for each grain of the target, indicating the position of the data presented to the host system.

When data has been copied to the target disk for a particular grain, that grain is said to have been split and a bit is set in the split bitmap. In this description it will be assumed that the size of a grain is the same as the size of the unit of allocation for the space efficient disk. If this is not the case, this description can easily be extended by anyone skilled in the art. For example, the cleaning process may be required to ensure that a number of contiguous grains are clean before instructing the space efficient component to de-allocate that area of disk.

Figure 4:
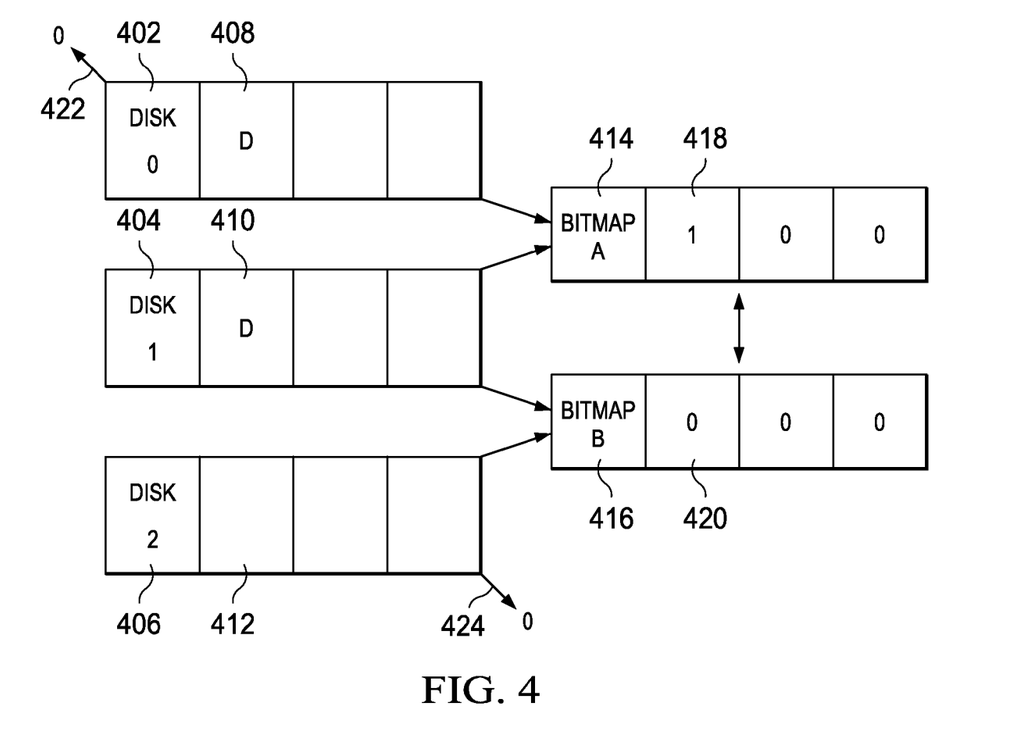
FIG. 4 is a block diagram of a relationship among disk images in accordance with illustrative embodiments.

With reference to FIG. 4, a block diagram of a relationship among disk images is shown, in accordance with illustrative embodiments. Storage system 400 contains three disks, Disk 0 402, Disk 1 404 and Disk 2 406, and two FlashCopy maps map A 414 and map B 416. Map A 414 maps data between Disk 0 402 and Disk 1 404, while map B 416 maps data between Disk 1 404 and Disk 2 406. A dirty grain, storage space that has been allocated and used, is defined as being dirty when a bit in map A 414 is set and a corresponding bit in map B 416 is not set. For example, grain 408 of Disk 0 402 contains data and has been copied to Disk 1 404, thereby setting map A bit 418 to "1." Disk 2 406 is dependent upon Disk 1 404 for the data of grain 410 as indicated by bits in map B 416 having bit 420 set to "0". Thus there is a discrepancy between the values in bit 418 and bit 420, defining a dirty grain. Disk 2 406 is dependent upon Disk 1 404 for a copy of the data in Disk 1 404 as indicated by the empty space 412 and map B.

Disk 0 402 is the start of the cascade as indicated by an upward pointer 422 of null and maps to downstream Disk 1 404 by map A 414. Disk 1 404 has an upward pointer to map A 414 and maps downstream to Disk 2 406 by map B 416. Disk 2 406 is the end of the cascade as indicated by a downward pointer 424 of null.

Dirty grains can be cleaned by placing the map in cleaning mode. Dirty grains are determined by comparing the upstream and downstream maps to locate discrepancies as just defined. The dirty grain is located and read from the source disk and copied to the next downstream disk. The bitmap for the downstream map is then updated to indicate that the grain has been split and is no longer dirty.

Figure 5:
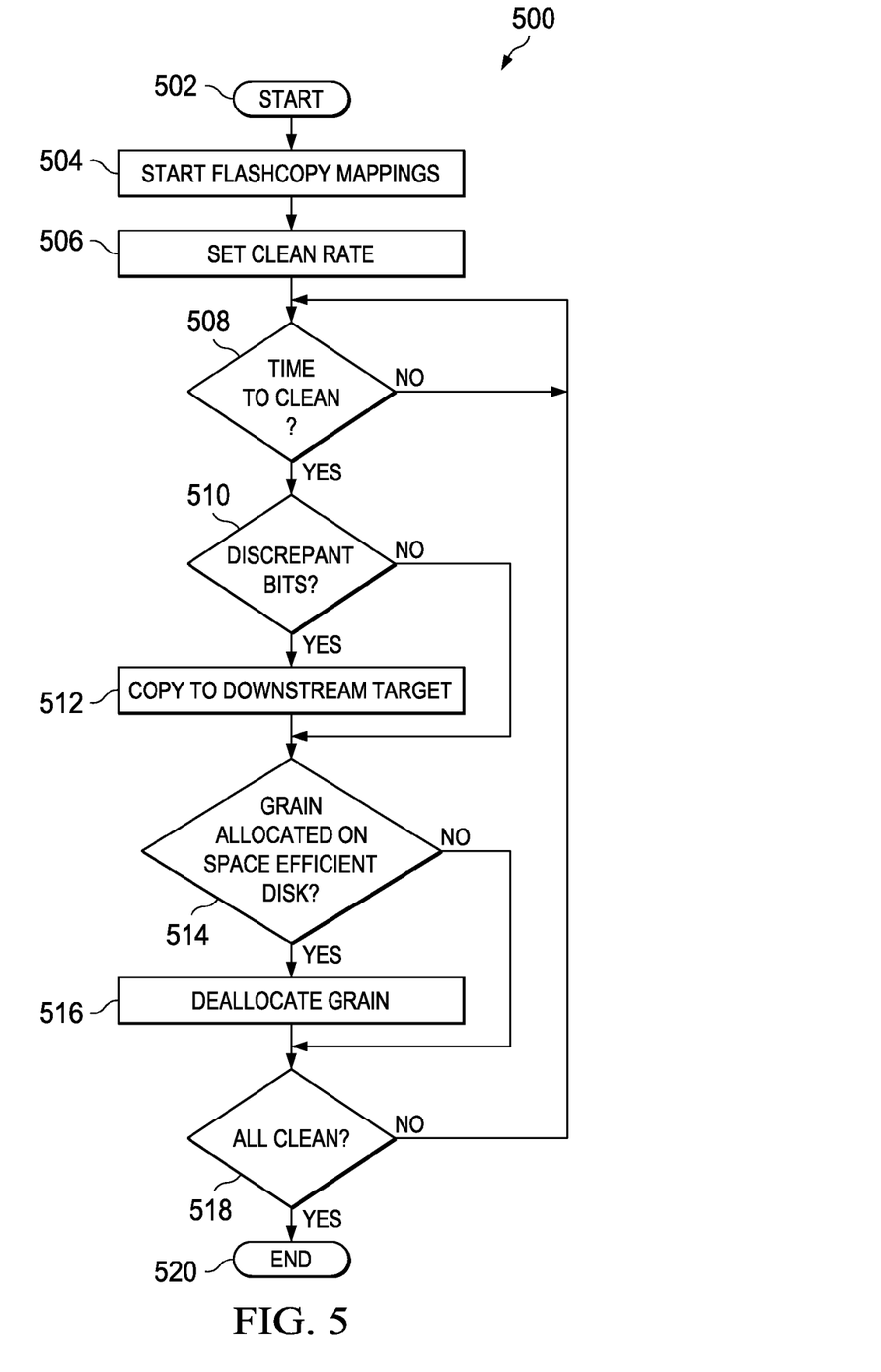
FIG. 5 is a flowchart of a cascade cleaning process in accordance with illustrative embodiments.

With reference to FIG. 5, a flowchart of a cascade cleaning process in accordance with illustrative embodiments is shown. Process 500 is an example of use of cascade cleaning manager 300 of FIG. 3 as may be operated on storage system 108 of FIG. 1. Process 500 starts (step 502) and starts FlashCopy mappings (step 504). A clean rate is set for the maps (step 506).

A determination is made whether time to clean is met (step 508). If it is time to clean a "yes" is obtained. If it is not time to clean, a "no" is obtained. When a "no" is obtained in step 508, process 500 loops back to step 508 to check the time again. If a "yes" is obtained in step 508, a determination is made whether there are discrepant bits (step 510).

If there are discrepant bits, a "yes" results from step 510. If there are no discrepant bits found a "no" results in step 510 and process 500 skips to step 514. If the result was "yes" from step 510, a copy to downstream target is performed (step 512).

A determination is made whether the grain was allocated on a space efficient disk (step 514). If the allocation was made on a space efficient disk, a "yes" results in step 514. If the allocation did not occur on a space efficient disk, a "no"

results. If the response in step 514 was "no" process 500 skips to step 518. If the response was "yes" de-allocate the grain occurs (step 516).

A determination is then made whether all grains have been cleaned (step 518). If all grains that can be cleaned have been cleaned, a "yes" results in step 518. If all grains have not been cleaned a "no" results in step 518 and process 500 loops back to step 508. If a "yes" was obtained in step 518, process 500 terminates thereafter (step 520).

With reference to elements of FIG. 4 again, a grain, say grain number "n", on a target disk, of Disk 1 404, is said to be dirty if bit "n" in map A 414 is set and bit "n" in map B 416 is not set. Cleaning a dirty grain for a given map is the process of copying the dirty grain to Disk 2 406 and then setting bit "n" in map B 416. In this situation the grain was initially allocated on Disk 1 404 and the process of copying the grain will cause it to be allocated on Disk 2 406 as well. This additional step which de-allocates the grain on Disk 1 404 after the bit has been set in map B 416 is possible because when the cleaning process runs for a map that is stopping, Disk 1 404 is unavailable to any host system and the data is now available on Disk 2 406.

With the system defined as above when a map is stopped, a process is started which will clean the grains. The process of cleaning a disk consists of searching the bitmaps of the upstream and downstream map to locate dirty grains. When a dirty grain is located it is read from the disk and written to the next downstream target disk. The bits for the downstream map are then updated to indicate that the grain has been split and hence, the grain is no longer dirty. The grain can then be de-allocated on the upstream target disk. As the search proceeds, any grains that are not dirty, that is grains that are already clean, can be de-allocated immediately, thereby freeing storage more quickly.

The cleaning process is repeated until all of the grains for the mapping being stopped have been considered. At this point, none of the grains on the target disk of the mapping being stopped are allocated and the mapping can be removed from the cascade and deleted (or restarted).

If this system was extended to consider incremental FlashCopy maps, it would not be possible to de-allocate all grains as they were cleaned because some may be required if the mapping is retriggered. In this situation, it would be valid to de-allocate grains that are split and different from the source. These grains need to be recopied anyway when the mapping is retriggered. It may be possible to indicate to the system that the mapping is being stopped prior to a delete and that all grains can be de-allocated anyway. The de-allocation of storage on one disk, during the cleaning process occurs at the same rate that storage is required to be allocated on another disk in the system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for storage de-allocation during a clean process, the computer implemented method comprising:
   determining whether to perform the clean process for a target disk of a plurality of disks in a storage system;
   responsive to a determination to perform the clean process, identifying a first grain in the target disk, an upstream map for the target disk, and a downstream map for the target disk;
   comparing an entry for the first grain in the upstream map with an entry for the first grain in the downstream map;
   determining whether the entry for the first grain in the upstream map is different than the entry for the first grain in the downstream map to identify whether a set of discrepant bits is present;
   responsive to determining that the entry for the first grain in the upstream map is different than the entry for the first grain in the downstream map, copying data from the first grain to a second grain in a second disk of the plurality of disks, wherein the second disk is downstream from the target disk;
   setting the entry in the downstream map to be the same as the entry in the upstream map;
   determining whether the first grain has been allocated to a space efficient storage unit; and
   responsive to determining that the data from the first grain has been allocated to the space efficient storage unit, de-allocating the first grain from the target disk.

2. The computer implemented method of claim 1, wherein determining whether to perform the clean process comprises:
   determining whether one of receiving a request to clean and an event initiating the clean process has been received.

3. The computer implemented method of claim 1, wherein the plurality of disks in a storage system are cascaded in the storage system, wherein each disk in the plurality of disks comprises an upstream map referencing data stored in a disk that is upstream from the each disk and a downstream map referencing data stored in a disk that is downstream from the each disk.

4. The computer implemented method of claim 1, wherein the first grain is a sequence of contiguous logical block areas in the target disk and wherein de-allocating the first grain from the target disk comprises:

removing access to the sequence of contiguous logical block areas in the target disk from a host system associated with the storage system.

5. A data processing system for storage de-allocation during a clean process, the data processing system comprising:
   a bus;
   a memory connected to the bus, the memory comprising program code;
   a processor unit connected to the bus, wherein the processor unit executes the program code to:
   determine whether to perform the clean process for a target disk of a plurality of disks in a storage system;
   responsive to a determination to perform the clean process, identify a first grain in the target disk, an upstream map for the target disk, and a downstream map for the target disk;
   compare an entry for the first grain in the upstream map with an entry for the first grain in the downstream map;
   determine whether the entry for the first grain in the upstream map is different than the entry for the first grain in the downstream map to identify whether a set of discrepant bits is present;
   responsive to determining that the entry for the first grain in the upstream map is different than the entry for the first grain in the downstream map, copy data from the first grain to a second grain in a second disk of the plurality of disks, wherein the second disk is downstream from the target disk;
   set the entry in the downstream map to be the same as the entry in the upstream map;
   determine whether the first grain has been allocated to a space efficient storage unit; and
   responsive to determining that the data from the first grain has been allocated to the space efficient storage unit, de-allocate the first grain from the target disk.

6. A computer program product for storage de-allocation during a clean process, the computer program product comprising:
   a set of computer-readable storage devices storing program code;
   program code for determining whether to perform the clean process for a target disk of a plurality of disks in a storage system;
   program code for identifying, responsive to a determination to perform the clean process, a first grain in the target disk, an upstream map for the target disk, and a downstream map for the target disk;
   program code for comparing an entry for the first grain in the upstream map with an entry for the first grain in the downstream map;
   program code for determining whether the entry for the first grain in the upstream map is different than the entry for the first grain in the downstream map to identify whether a set of discrepant bits is present;
   program code for copying, responsive to determining that the entry for the first grain in the upstream map is different than the entry for the first grain in the downstream map, data from the first grain to a second grain in a second disk of the plurality of disks, wherein the second disk is downstream from the target disk;
   program code for setting the entry in the downstream map to be the same as the entry in the upstream map;
   program code for determining whether the first grain has been allocated to a space efficient storage unit; and
   program code for de-allocating, responsive to determining that the data from the first grain has been allocated to the space efficient storage unit, the first grain from the target disk.

* * * * *